(12) United States Patent
Mathi et al.

(10) Patent No.: US 10,252,861 B2
(45) Date of Patent: Apr. 9, 2019

(54) PICKING SYSTEM AND PICKING SITE FOR PICKING ARTICLES FOR ORDER AND BATCH PICKING

(71) Applicant: KNAPP AG, Hart bei Graz (AT)

(72) Inventors: Franz Mathi, Gleisdorf (AT); Roland Koholka, Lannach (AT); Rick Bingle, Black Diamond, WA (US); Peter Stock, Aschaffenburg (DE)

(73) Assignee: KNAPP AG, Hart Bei Graz (AT)

( * ) Notice: Subject to any disclaimer, the term of this patent is extended or adjusted under 35 U.S.C. 154(b) by 0 days.

(21) Appl. No.: 15/753,526

(22) PCT Filed: Aug. 17, 2016

(86) PCT No.: PCT/AT2016/060030
§ 371 (c)(1),
(2) Date: Feb. 19, 2018

(87) PCT Pub. No.: WO2017/027897
PCT Pub. Date: Feb. 23, 2017

(65) Prior Publication Data
US 2018/0244473 A1 Aug. 30, 2018

(30) Foreign Application Priority Data

Aug. 19, 2015 (AT) ..................................... 246/2015

(51) Int. Cl.
*B65G 1/137* (2006.01)
*B65G 17/20* (2006.01)
(Continued)

(52) U.S. Cl.
CPC ............ *B65G 1/1378* (2013.01); *B65B 35/44* (2013.01); *B65G 13/02* (2013.01); *B65G 17/20* (2013.01);
(Continued)

(58) Field of Classification Search
CPC .............................. B65G 1/1378; B65G 17/20
See application file for complete search history.

(56) References Cited

U.S. PATENT DOCUMENTS

2009/0026041 A1* 1/2009 Schaefer ................ B65G 1/127
198/456
2012/0245728 A1* 9/2012 Koholka .............. B65G 1/1378
700/216
(Continued)

FOREIGN PATENT DOCUMENTS

DE 10 2011 116081 B3 4/2013
EP 2 862 818 A1 4/2015
(Continued)

*Primary Examiner* — Thomas Randazzo
(74) *Attorney, Agent, or Firm* — Jonathan A. Kidney; CKR Law LLP

(57) ABSTRACT

A system for picking articles from storage containers into containers by using a computer for handling and processing picking orders and a picking station according to the good-to-person-principle. Selected articles by the computer are picked from the storage containers into conveyor bags, and a suspension conveyor transports the conveyor bags to a packing location for packing the articles assigned to a picking order, and retrieves the conveyor bags into the order container assigned to the picking order. An order container conveyor transports order containers (boxes), and the computer processes a first picking order to determine the number of article to be picked at the picking station such that the number of articles required for picking the first picking order is picked into the order container assigned to the first picking order with later articles matched/picked to a conveyor bag for later picking of further picking orders at the packing location.

20 Claims, 2 Drawing Sheets

(51) Int. Cl.
*B65B 35/44* (2006.01)
*B65G 13/02* (2006.01)
*B65G 47/90* (2006.01)

(52) U.S. Cl.
CPC .... *B65G 47/905* (2013.01); *B65G 2201/0238* (2013.01); *B65G 2201/0258* (2013.01); *B65G 2209/00* (2013.01); *B65G 2209/02* (2013.01); *B65G 2209/08* (2013.01)

(56) References Cited

U.S. PATENT DOCUMENTS

| | | | | |
|---|---|---|---|---|
| 2014/0039667 A1* | 2/2014 | Collin | ............ | B65G 1/0485 700/215 |
| 2014/0083058 A1* | 3/2014 | Issing | ............ | B65G 1/1378 53/473 |
| 2016/0194153 A1* | 7/2016 | Issing | ............ | B65G 1/1378 700/216 |

FOREIGN PATENT DOCUMENTS

| | | |
|---|---|---|
| JP | 2001 253515 A | 9/2001 |
| JP | 3 633679 B2 | 3/2005 |

\* cited by examiner

PICKING SYSTEM AND PICKING SITE FOR PICKING ARTICLES FOR ORDER AND BATCH PICKING

CROSS-REFERENCE TO RELATED APPLICATION(S)

This application claims the benefit of PCT Application no. PCT/AT2016/060030 filed 17 Aug. 2016, claiming priority to Austrian Application no. GM 246/2015 filed 19 Aug. 2015, the contents of which are hereby incorporated by reference in their entirety.

FIELD

The invention relates to a picking system for picking articles from storage containers into order containers by using a controlling computer for handling and processing picking orders and having at least one picking station according to the goods-to-person-principle, at which a number of articles predetermined by the controlling computer may be picked from storage containers into conveyor bags, and having a suspension conveyor technique for transporting the conveyor bags and having a packing location for packing the articles assigned to a picking order and retrieved from the conveyor bags into order containers assigned to the picking order.

BACKGROUND

The document DE 10 2011 116 081 B3 discloses a picking system having a picking station, at which a storage container conveyor technique transports storage containers to the working area of a picking person, whereupon the number of articles determined by a controlling devices is retrieved by the picking person from the storage container. The order container conveyer technique is formed by a suspension conveyor technique and delivers conveyor bags, whereupon the picking person places the retrieved articles into the conveyor bags indicated by the controlling device. In this way, there is carried out a batch picking, in which the articles of several orders are put into a conveyor bag. In a subsequent buffering and sorting area, the conveyor bags are then temporarily stored and/or put into the correct ordering in order to pack the articles at a subsequent packing station into respectively one order container per order. Batch picking has the advantage that the storage container conveyor technique is relieved as the storage container of a certain type of article need not be removed and restored upon picking every single time but rather several articles of this type may at once be retrieved for several orders and may be picked as a batch into a conveyor bag.

SUMMARY

The following presents a simplified summary in order to provide a basic understanding of some aspects of the claimed subject matter. This summary is not an extensive overview, and is not intended to identify key/critical elements or to delineate the scope of the claimed subject matter. Its purpose is to present some concepts in a simplified form as a prelude to the more detailed description that is presented later.

For orders having different requirements (e.g., sequencing requirements, article assortment, sorting criteria, order structure, etc.), a single-step or also a dual-step order picking may be more advantageous. Picking orders for B2B customers (so-called "shop orders") usually contain a great amount of articles, wherein there are usually also contained several pieces of each article type in the picking order. A "shop order" of, e.g., a clothes shop may, for example, contain shirts of various brands or colours in all sizes, which have to be picked into order containers in a sorted way. Picking orders for the B2C customer (so-called "e-commerce order") or for B2B customers with only small shops or repeat orders usually contain only one or few articles, having the effect that storage containers with these articles have to be retrieved often from warehouse and transported back to the warehouse.

The invention relies on the task of providing a picking system and a picking method, wherein picking orders of B2B customers as well as B2C customers may be flexibly picked with as low a stress on the storage container conveyor technique as possible. According to the invention, this task is solved in a picking system such, that at the picking station an order container conveyor technique for transporting order containers, in particular boxes, is provided, and that the controlling computer for processing a first picking order being configured to determine the number of articles to be picked at the picking station such that number of articles required for picking the first picking order is picked into the order container assigned to the first picking order and further articles contained in the storage container are picked into at least one conveyor bag for a later picking of further picking orders at the packing location.

According to the invention this task is solved in a picking method in that for picking articles from storage containers into order containers by using a controlling computer for handling and processing picking orders, which predetermines the picking at at least one picking station and the packing at one packing location, the following method steps are performed:

Transporting a storage container with articles required for a first picking order from a storage rack to the picking station;

Picking the number of articles required for the first picking order from the storage container into the order container assigned to the picking order at the picking station;

Picking further articles contained in the storage container into at least one conveyor bag at the picking station;

Transporting the articles picked into the conveyor bags to a packing location for further picking orders;

Packing the articles assigned to the further picking orders and retrieved from the conveyor bags into the order container assigned to the further picking order.

In this way, there is obtained the advantage that a storage container with one article type of articles for picking a shop order only has to be conveyed using the storage container conveyor technique to the picking station, as this type of article may then be picked in the desired number into the order container of the shop order as well as into conveyor bags for the later picking of further e-commerce orders or comparable picking orders having smaller number of pieces. In this way, the storage container conveyor technique is significantly relieved.

The picking station of the picking system enables in an ergonomically well-accessible arranged that conveyor bags arranged in the arrangement row and second order containers arranged in the further arrangement row may be picked. The term order container is thereby to be interpreted in a broad sense and does not contain only boxes and conveyor bags but rather also an area reserved for an order on the order container conveyor technique. Depending on the embodiment of the order containers and the associated order container conveyor techniques, there is realized great flexibility in regard to the type of picking due to the picking station.

Advantageously, there is enabled the dual-step picking or batch picking into conveyor bags at the picking station. At the same picking station there may simultaneously or also temporarily offset be performed a single-step picking from the storage containers into the second order containers, which are formed by boxes and arranged directly next to the storage containers in the arrangement row. The simultaneous picking of "e-commerce orders" and "shop orders" at a picking station has the advantage that for picking into the conveyor bags there may be obtained a high batch factor, as there may also be processed orders, which are not required immediately at the packing location.

Further advantageously, depending on the selected order container conveyor technique and depending on the selected order containers, there is also to be performed a determination by the controlling device of the picking station whether there is performed an order picking or optionally also a batch picking using the suspension conveyor technique or the order container conveyor technique. In this way, for example, there may be determined that at the picking station there are picked exclusively "batches" into the conveyor bags using the suspension conveyor technique, wherein into the boxes of the order container conveyor technique there will be picked individual orders as well as also "batches".

Particularly advantageous is in the picking system according to the invention that there is formed a storage loop in the form of a carousel conveyor for storing the conveyor bags. In a classic sorting device according to prior art, there have to be provided ramps for every order in order to temporarily store the articles already picked for this order. The number of the ramps, hence, limits the number of the picking orders in an order pool that are processed in parallel. This limitation is not existent in the picking system according to the invention having the carousel conveyor and a slightly increasable storage capacity.

Further advantageous embodiments of the picking station according to the invention are explained in greater details in the following by way of the figures.

DETAILED DESCRIPTION

Figure 1:
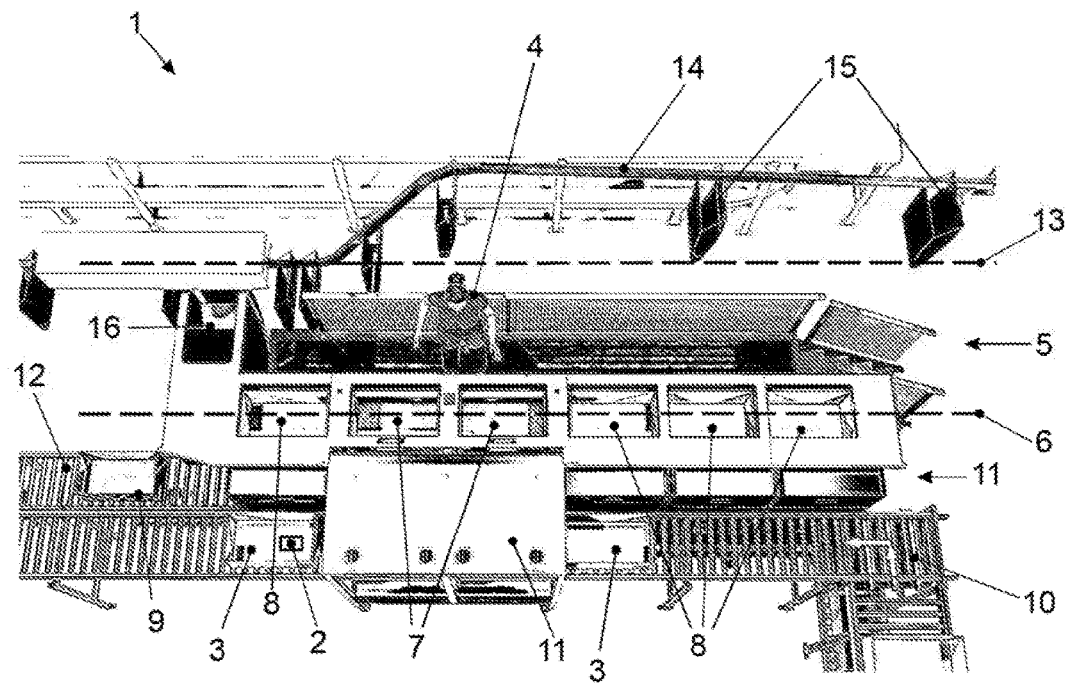
FIG. 1 shows a picking station according to a first embodiment example of the invention having a suspension conveyor technique in an oblique view.

FIG. 1 shows a picking station 1 for picking articles 2 from storage containers 3 formed by boxes into order containers 9 according to the good-to-person-principle. A picking person 4 may freely move in a picking area, which is formed by a corridor and slightly lifted from the ground, being easily accessible via stairs. In parallel to the corridor, there is situated an arrangement row 6, in which there are provided two storage container bays 7 for accommodating storage containers 3 and four order container bays 8 for accommodating order containers 9 formed by boxes.

Figure 2:
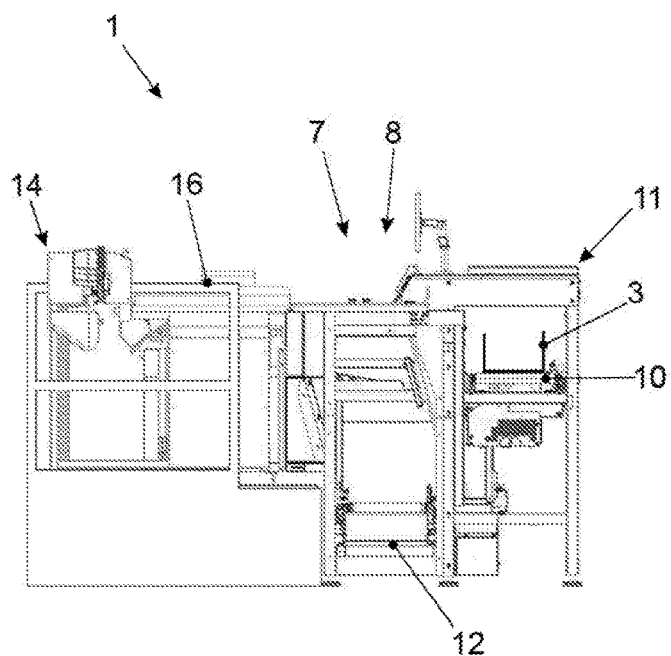
FIG. 2 shows the picking station according to FIG. 1 in a sectional side view.

The picking station 1 is provided in a picking system 20 depicted in FIG. 4, having an article storage system 21 for storing the articles 2 provided in the storage containers 3. Controlled via a controlling computer, the storage containers 3 with articles 2 required for picking are transported by a storage container conveyor technique 10 from the article storage system 21 to the picking station 1. The storage container conveyor technique 10 is formed according to this embodiment example by a roller conveyor, in an article storage system having articles stored suspended such as clothes, however, it may also be formed by a suspension conveyor technique. The storage container conveyor technique 10 transports the storage container 3 in manipulation means 11 of the picking stations 1, which is depicted in FIG. 2 in a sectional side view. The manipulation means 11 transport the storage container 3 in the direction of the picking person 4 into one of the storage container bays 7 in order to enable an ergonomical removal of the article 2 to be picked by the picking person 4. After picking, the manipulation means 11 transport the storage container 3 again out of the storage container bay 7, and the storage container conveyor technique 10 transports the storage container 3 again back into the article storage system 21.

The picking station 1 further has an order container conveyor technique 12 formed by a roller conveyor, which is configured to transport the order containers 9 formed by boxes. An order container 9 assigned to one or several orders is transported by the order container conveyor technique 12 into the manipulation means 11 and pushed by the manipulation means 11 underneath one of the order container bays 8 and lifted by a container lifting device of the manipulation means 11 up to the working height of the picking person 4. In this way, it is made possible to put the article 2 to be picked into the order container 9 in an ergonomical way.

As visible by way of FIG. 2, the storage container conveyor technique 10 is arranged on a level above the order container conveyor technique 12. In this way, there is obtained the advantage that the picking station 1 may be realized in an especially space-saving manner. For this reason, it would further be possible to arrange the storage container conveyor technique 10 on a level underneath the order container conveyor technique 12.

The picking station 1 now has a suspension conveyor technique 14 arranged in a further arrangement row 13 opposite the arrangement row 6 along the picking area 5, by means of which the conveyor bags 15 may be transported. In this way, there is obtained the advantage that articles 2 retrieved from the storage containers 3 may be picked into a conveyor bag 15 as well as into an order container 9 formed by a box.

Der picking station 1 further has a depositing area 16 as an end of the picking area 5 between the arrangement row 6 and the further arrangement row 13, wherein picked articles 2 are transferred onto the depositing area 16 into conveyor bags 15 of the suspension conveyor technique 14 and in particular slide into the conveyor bags 15. In this way, there is obtained a particularly easy and reliable type of transfer of the picked article 2 into the conveyor bags 15.

Due to the multiple possibilities for picking at the picking station 1, the controlling device of the picking station 1 may be configured to perform a pure order picking or a batch picking into first order containers or into second order containers. As the picking orders of the shops and customers may change dependent on the time of the day, it may be possible to respond to the current workload of the conveyor techniques and picking stations in order to obtain a throughput of picking orders as high as possible in the entire picking system.

The picking person may also be substituted by a picking robot, which may perform the tasks of the picking person.

Such picking robots have been known for a long time to those skilled in the art, which is why this will not be explained herein in greater detail.

Figure 3:
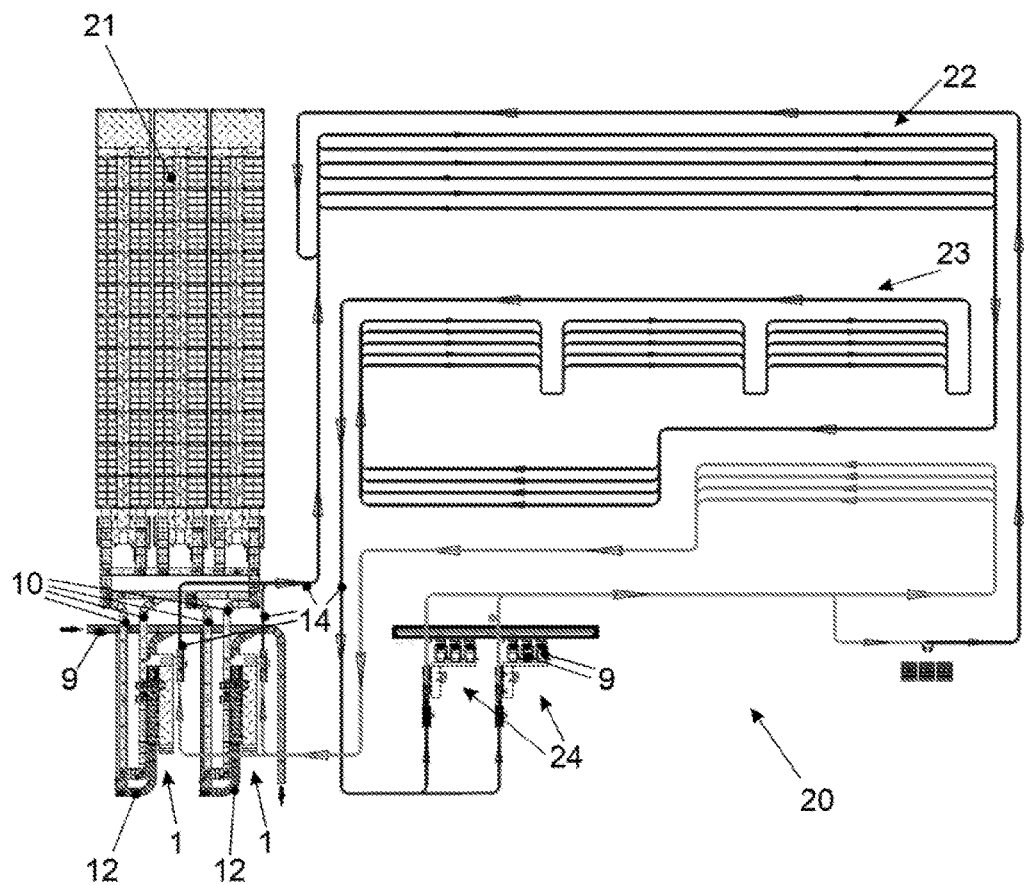
FIG. 3 shows a picking system having two picking stations according to FIG. 1 and a batch picking into conveyor bags.

FIG. 3 shows the picking system 20 with the article storage system 21, the storage container conveyor technique 10, by means of which the storage containers 3 are transported to one of the two picking stations 1 in order to pick articles 2 contained in the storage container 3 into one of the order containers 9 of a shop order or into conveyor bags 15 for batch picking e-commerce orders. The articles 2 that are preferably picked individually into conveyor bags 15 are transported by the suspension conveyor technique 14 in a storage loop or a carousel conveyor 22, respectively, wherein the conveyor bags 15 are circulated and temporarily stored until all articles 2 required for processing an e-commerce order are provided in conveyor bags 15. Subsequently, these are discharged from the carousel conveyor 22 and supplied to a triple-step-sorting step 23 or a matrix sorter, respectively, in which up to 12 conveyor bags 15 of one or several e-commerce orders are sorted into the correct order. Subsequently, the sorted conveyor bags 15 are supplied to one of the two packing locations 24, at which the articles of an e-commerce order are retrieved from the conveyor bag 15 and packed into an order container for dispatch. Empty conveyor bags 15 are again supplied from the packing locations 24 to the picking stations 1.

By means of the picking systems 20, there is obtained the advantage that the article storage system 21 and the storage container conveyor technique 10 may be significantly relieved, as the storage container 3 needs to be removed only once in order to perform an order or batch picking. By means of the carousel conveyor 22, there is obtained a de-coupling of the storage and removal process of the article storage system 21 from the picking process at the packing locations 24, whereby short-term performance peaks at the picking station may be prevented or decreased by pre-picking. By pre-picking and due to the storage capacity of the system, there may be obtained a high batch factor. The desired batch factor may be determined by the dimensioning of the storage capacity in the system design.

These de-coupling is difficult to be realized using a belt conveyor technique, as, for this purpose, there would have to be provided a large number of ramps. With the picking system 20 it is particularly advantageous that the individual articles 2 need not be moved manually or need not be picked up manually, respectively, thus decreasing costs and increasing through-put.

There may be noted that articles 2 on pallets or also retour goods may also be placed directly, this is not at the picking station 1, into conveyor bags 15 and supplied to the carousel conveyor 22. But also the picking station 1 is especially advantageously suitable for processing retour goods or returned articles. The controlling device of the picking station 1 recognizes storage containers 3, in which the returned articles 2 may be supplied to the picking station 1, or it receives appropriate information from the higher-level controlling computer of the picking system 20. Articles 2 are designated as retour goods or returned articles, if they have already been picked once as an order but have been returned or delivered by the client as not-desired. Retour goods may be restored in storage containers 3 back into the article storage system 21 until these are again required for a picking order and are again retrieved from the article storage system 21 to the picking station 1. It is, however, especially advantageous to supply returned articles 2 in a storage container 3 to the picking station 1 and to pick these for temporary storage at the picking station 1 into conveyor bags 15. The conveyor bags 15 are then temporarily stored in the carousel conveyor 22 as a dynamic intermediate buffer. If such a returned article 2 in the conveyor bag 15 is required for a picking order, then the conveyor bags 15 may be transported with the returned article to the packing location 24 and the returned article 2 may be placed into the order container 9 directly at the packing location 24. On the other side, however, the conveyor bag 15 could be transported with the returned article also to the picking station 1 and then the returned article 2 may be picked there into the order container 9. In this way, there is effected an especially effective processing of retour goods, without further strain on the storage container conveyor technique 10 and the article storage system 21.

Picking orders of an order pool, which is composed of currently provided or selected picking orders, may be processed together. In this case, there would be retrieved from a storage container 3 exactly the number of articles 2 of a type of article, which corresponds to the sum of all numbers of this type of article in the picking orders of the picking pool. The number of articles 2 would then, as already described above, be distributed among order containers 9 in order container bays 8 and conveyor bags 15. As the order pool may change dynamically, there is in this way obtained an especially efficient type of processing the picking orders with the picking station 1 in the picking system 20.

According to a further embodiment example of the invention that is not depicted in the figures, the suspension conveyor technique, compared to the suspension conveyor technique 14 depicted in FIG. 1, would be arranged rotated about 90 degrees at the picking station. The further arrangement row would, according to this embodiment example, thus be essentially vertically to the arrangement row. The suspension conveyor technique would transport conveyor bags to a depositing area that is also rotated about 90 degrees and it would further transport the conveyor bags after filling with the picked articles via the storage container conveyor technique and the second order container conveyor technique. Further possible would be an inverted transport direction of the suspension conveyor technique or an arrangement of the arrangement row and the further arrangement row at another angle of, for example, 45 degrees. The arrangement of the further arrangement row essentially vertically or oblique to the arrangement row has the advantage of providing higher flexibility in order to integrate the picking station into the entire picking system in a space-saving manner.

There may be noted that the storage container conveyor technique and the order container conveyor technique are to be understood as being arranged in the arrangement row within the frame of the description of this invention even if these conveyor techniques are arranged only insignificantly in parallel and offset to each other.

What is claimed is:

1. A picking system for picking articles from storage containers into order container, comprising:
   a controlling computer for handling and processing picking orders;
   at least one picking station according to the good-to-person-principle, at which a number of articles predetermined by the controlling computer are pickable from the storage containers transported by a storage container conveyor technique into conveyor bags;
   a suspension conveyor technique for transporting the conveyor bags;

a packing location for packing the articles assigned to a picking order and retrieved from the conveyor bags into the order containers assigned to the picking order, wherein, at the picking station an order container conveyor technique is provided for transporting order containers or boxes, wherein the controlling computer is configured to determine the number of the article to be picked at the picking station such that the number of articles required for picking the first picking order is picked into the order container assigned to the first picking order and further articles contained in the storage container are picked into at least one conveyor bag for the later picking of further picking orders at the packing location.

2. The picking system according to claim 1, wherein that the controlling computer for processing the further picking orders is configured to predetermine the number of the articles to be picked at the picking station such that the further articles contained in the storage container are picked individually into respectively one conveyor bag for the later picking of the further picking orders at the packing location.

3. The picking system according to claim 1, wherein the controlling computer for processing a number of further picking orders of an order pool is configured to predetermine the number of the articles to be picked at the picking station, such that the number of the articles contained in the storage container that is required for the further picking orders contained in the order pool is picked individually or according to any further picking order collectively into a conveyor bag for the later picking of these further picking orders at the packing location.

4. The picking system according to claim 1, wherein the conveyor bags of the suspension conveyor technique are used for batch picking and the order containers of the order container conveyor technique are used for order picking.

5. The picking system according to claim 1, wherein the controlling computer for processing the further picking orders is configured to predetermine the number of the articles to be picked at the picking station such that all remaining articles contained in the storage container are picked into at least one conveyor bag for the later picking of the further picking orders at the packing location.

6. The picking system according to claim 5, wherein that the controlling computer for processing the further picking orders is configured to predetermine the number of the articles to be picked at the picking station such that the further articles contained in the storage container are picked individually into respectively one conveyor bag for the later picking of the further picking orders at the packing location.

7. The picking system according to claim 5, wherein the controlling computer for processing a number of further picking orders of an order pool is configured to predetermine the number of the articles to be picked at the picking station, such that the number of the articles contained in the storage container that is required for the further picking orders contained in the order pool is picked individually or according to any further picking order collectively into a conveyor bag for the later picking of these further picking orders at the packing location.

8. The picking system according to claim 5, wherein the conveyor bags of the suspension conveyor technique are used for batch picking and the order containers of the order container conveyor technique are used for order picking.

9. The picking system according to claim 1, wherein the suspension conveyor technique has at least one storage loop for the temporary storage of conveyor bags containing articles and/or that by means of the suspension conveyor technique there is configured a sorting device for sorting the articles picked into the conveyor bags according to the further picking orders.

10. The picking system according to claim 9, wherein the controlling computer for processing the further picking orders is configured to predetermine the number of the articles to be picked at the picking station such that all remaining articles contained in the storage container are picked into at least one conveyor bag for the later picking of the further picking orders at the packing location.

11. The picking system according to claim 9, wherein that the controlling computer for processing the further picking orders is configured to predetermine the number of the articles to be picked at the picking station such that the further articles contained in the storage container are picked individually into respectively one conveyor bag for the later picking of the further picking orders at the packing location.

12. The picking system according to claim 9, wherein the controlling computer for processing a number of further picking orders of an order pool is configured to predetermine the number of the articles to be picked at the picking station, such that the number of the articles contained in the storage container that is required for the further picking orders contained in the order pool is picked individually or according to any further picking order collectively into a conveyor bag for the later picking of these further picking orders at the packing location.

13. The picking system according to claim 9, wherein the conveyor bags of the suspension conveyor technique are used for batch picking and the order containers of the order container conveyor technique are used for order picking.

14. A picking method for picking articles from storage containers into order containers for a picking system using a controlling computer for handling and processing picking orders, which predetermines the picking at least one picking station and the packing at one packing location, comprising:
    transporting a storage container with articles required for a first picking order from a storage rack to the picking station by means of the storage container conveyor technique;
    computerized picking the number of articles required for the first picking order from the storage container into the order container assigned to the first picking order and transported by the order container conveyor technique at the picking station;
    wherein the controlling computer further predetermines:
    picking further articles contained in the storage container into at least one conveyor bag transported by the suspension conveyor technique at the picking station; and
    transporting the articles picked into the conveyor bags to the packing location for further picking orders; and
    packing the articles assigned to one of the further picking orders and retrieved from the conveyor bags into the order container assigned to the further picking order.

15. The picking method according to claim 14, wherein the picking at the least one picking station and the packing at the at least one packing location is realized in a temporally and locally independent way due to the temporary storage of the articles required for further picking orders in conveyor bags.

16. The picking method according to claim 14, wherein articles for conveyor bags containing further picking orders are delivered to the packing location sorted according to the further picking orders.

17. The picking method according to claim 16, wherein the picking at the least one picking station and the packing at the at least one packing location is realized in a temporally and locally independent way due to the temporary storage of the articles required for further picking orders in conveyor bags.

18. The picking method according to claim 14, wherein the further articles contained in the storage container are picked individually into respectively one conveyor bag at the picking station.

19. The picking method according to claim 18, wherein articles for conveyor bags containing further picking orders are delivered to the packing location sorted according to the further picking orders.

20. The picking method according to claim 18, wherein the picking at the least one picking station and the packing at the at least one packing location is realized in a temporally and locally independent way due to the temporary storage of the articles required for further picking orders in conveyor bags.

* * * * *